United States Patent [19]

Yeager et al.

[11] Patent Number: 4,659,624

[45] Date of Patent: Apr. 21, 1987

[54] HYBRID AND UNIDIRECTIONAL CARBON-CARBON FIBER REINFORCED LAMINATE COMPOSITES

[75] Inventors: Robert E. Yeager, Greenville; Isaac E. Harder, Grand Prairie; Earl L. Stone, III, Arlington, all of Tex.

[73] Assignee: LTV Aerospace & Defense Company, Dallas, Tex.

[21] Appl. No.: 554,872

[22] Filed: Nov. 25, 1983

[51] Int. Cl.$^4$ ................................................ B32B 9/00
[52] U.S. Cl. ................................ 428/408; 156/245; 264/29.1; 264/29.2; 264/29.5; 423/447.1; 423/447.2; 428/246; 428/902
[58] Field of Search .............. 428/367, 408, 902, 246; 264/29.1, 29.2, 29.5; 423/447.1, 447.2; 156/245

[56] References Cited

U.S. PATENT DOCUMENTS

| | | | |
|---|---|---|---|
| 3,991,248 | 11/1976 | Bauer | 428/408 |
| 4,100,322 | 7/1978 | Seibold et al. | 428/408 |
| 4,341,830 | 7/1982 | Betts et al. | 428/408 |
| 4,409,048 | 10/1983 | Hatch et al. | 428/408 |

Primary Examiner—James J. Bell
Attorney, Agent, or Firm—S. S. Sadacca; J. M. Cate

[57] ABSTRACT

Novel carbon-carbon laminate composite materials capable of significantly increased strengths in at least one predetermined direction of load are disclosed. The composites can comprise plies of resin impregnated woven carbon or graphite cloth material in combination with resin impregnated carbon or graphite filament unidirectional tape or can be fabricated from the unidirectional tape alone. Generally the unidirectional reinforcement of the tape plies provides higher strengths and moduli in specific directions which can be controlled during lay up of parts. The processes for obtaining the beneficial increase strength of unidirectional tape ply materials while avoiding fabrication problems resulting therefrom are also disclosed.

24 Claims, No Drawings

HYBRID AND UNIDIRECTIONAL CARBON-CARBON FIBER REINFORCED LAMINATE COMPOSITES

TECHNICAL FIELD

This invention relates to reinforced carbon-carbon composite materials having improved structural properties along a predetermined direction of load. In another aspect this invention relates to reinforced carbon-carbon laminate materials which comprise plies of resin impregnated unidirectional carbon or graphite filament tape either alone or in combination with plies of resin impregnated woven carbon or graphite cloth materials. In a still further aspect, the invention relates to a process for producing carbon-carbon fiber reinforced laminate materials having increased strength capabilities along predetermined load bearing directions.

BACKGROUND ART

Carbon-carbon reinforced materials, first developed in connection with space related programs, offer advantages over other construction materials where high strength to weight ratios are required and where high temperatures will be part of the environment. Thus while most metal alloys demonstrate drastic reductions in tensile strength as temperatures rise, ultimately losing all practical usefulness at temperatures in the range of 1500° to 2000° F., carbon-carbon reinforced composites have been developed which maintain useful tensile strengths at temperatures up to 3500° and higher when coated with oxidation resistant materials. While tensile strengths of up to 40,000 psi have been achieved heretofore using laminates constructed of plies of inter-woven resin impregnated carbon or graphite cloth densified by liquid impregnation techniques, higher loads can only be carried by using a relatively large number of plies, undesirably increasing the volume and weight of the part to be produced therefrom.

Generally, reinforced carbon-carbon composite substrates are constructed of carbon fibers bound by a carbon matrix. Carbonaceous fibers such as polyacrylonitrile, rayon, and pitch based fibers are utilized. The original fibers are converted to carbon or graphite through pyrolysis techniques and are then impregnated with carbonizable liquid materials. The impregnated fibers are available either in the form of interwoven cloth or unidirectional "tape" in which bundles of the fibers are laid parallel to one another in a single direction without any cross weave fibers interconnecting same. These impregnated carbon fiber materials are used as plies to form a laminate of the desired shape, weight, and volume through a process which cures the impregnated resin materials. The cured laminate is then subjected to pyrolysis to decompose the cured resin to carbon. The resulting product is normally quite porous and must be densified using either liquid impregnation techniques or chemical vapor deposition techniques. As noted above, the resulting reinforced carbon-carbon composite material can then be treated to form an oxidation resistant coating thereon which allows the final part to be utilized at relatively high temperatures without mass loss due to oxidation.

Because they are less porous and provide more reinforcing fibers per unit volume, resin impregnated carbon filament unidirectional tapes provide higher strengths along the direction of the fibers than do carbon-carbon woven cloth plies. However, the reduced porosity of the unidirectional tapes presents problems during cure and densification procedures as resin movement is hampered and the necessary expulsion of gaseous products from resin decomposition to carbon also becomes a problem. Further, the thermal coefficient of expansion of carbon filament unidirectional tapes is greater in the direction of width than length thus introducing disruptive forces during the formation of a composite laminate having non-aligned tape plies or a combination of tape and cloth plies. Thus there exists a need for products which can take advantage of the higher directional strengths achievable through use of unidirectional tapes and for processes for producing same in a manner which eliminates the problems imposed through use of these denser laminate plies.

DISCLOSURE OF THE INVENTION

Carbon-carbon laminate materials can be fabricated in accordance with the present invention so as to provide strengths of 50,000 psi or greater along a predetermined direction of load. The laminates can comprise plies of unidirectional tape alone, plies of unidirectional tape with woven cloth faces on the upper and lower surfaces thereof, or hybrid laminates wherein cloth and unidirectional tape plies are both used to form the final laminate composite. Assuming that the forces to which the finished part will be subjected during use are known, the carbon-carbon laminate article can be tailored to achieve a greater strength along the predicted directions of greatest load. Strength tailoring of the part is achieved during the initial arrangement of the laminate plies (termed "layup"). Generally, increased strength will be attained in the direction parallel to the longitudinal direction of the tows of the unidirectional tape plies of the laminate. By selecting an arbitrary point as 0° during layup, the plies of unidirectional tape (and, optionally, intermediate layers of woven cloth) can be positioned at desired offsets to achieve selectively increased directional strengths. The "laid-up" laminate is then debulked under pressure to compress the plies and remove air trapped between the plies, cured under pressure and temperature conditions which allow the resin present in the fibers of the laminates to bond the plies together, pyrolyzed to convert the cured resin material to carbon, and finally densified to increase the strength of the final composite material. Coating procedures can then be employed to provide oxidation resistance at high temperatures.

The initial curing of the debulked laminate materials is very important since it is at this stage of processing that proper porosity must be obtained so that gases formed during post cure pyrolysis can escape from the laminate rather than causing disruption of same. The materials of the present invention are produced using a cure cycle which includes use of pressures sufficient to allow controlled evolution of volatiles. By maintaining pressure throughout the initial cure (as opposed to lowering same at some point in order to aid the escape of volatiles), it has been discovered that sufficient gas paths, or interconnecting pores, are formed to allow successful later pyrolysis of the cured laminate. Especially preferred is a cure cycle in which relatively low pressures are used initially with an increase in pressure near the gel point of the impregnated resin material. It is hypothesized that such treatment during cure provides for initial evolution of solvent gases and polymerization products while higher pressures, employed near the gel point of the resin, compress the laminate to form denser, stronger materials.

In addition to maintenance of pressure, or use of increasing pressures, during the initial cure cycle, the production of laminate materials employing plies of unidirectional tape require special attention to the movement of resin during that critical stage of processing. Conventionally, bleeder materials, such as canvas, have been employed to soak up excess resin materials which move to the top surface of laminates during cure. During production of conventional cloth laminate carbon-carbon composites, the number of layers of bleeder materials has increased with the number of plies of the laminate materials so that an undesirable film of resin material will not form on the surface. However, because of the greater density of unidirectional tape plies, it has been found that very little resin material "bleeds" through the plies to the top surface of the laminate, most resin movement being outward along the plane of the tape plies toward the edges thereof. Consequently when producing laminates comprising unidirectional tape plies, the resin which collects on the surface of the laminate is not removed but allowed to remain thereon. Use of conventional bleeding materials has been found to cause delamination of the surface plies due to low resin content in some cases.

Pyrolysis of the cured laminate at increasing temperatures reaching about 1500° F. over a period of about three days can then be employed to convert the cured resin materials to carbon. Densification, preferably through reimpregnation with carbonizable liquid materials, strengthens the laminates. Coating and post coating techniques for oxidation protection can then be employed to provide parts having structural strengths of 50,000 psi and greater along predetermined directions of load and having excellent resistance to degradation by oxidation at high temperatures.

DETAILED DESCRIPTION

The general description of the process set forth above will now be further explained through reference to specific materials and processes. Since different starting materials will cure and pyrolyze differently and because fabrication of specific part configurations employing built-up or reduced ply numbers inject special considerations, it is not possible to describe in detail every variation of the process of the subject invention. However, the techniques described above and further illustrated below in preferred embodiments are applicable to the fabrication of carbon-carbon composite materials wherein relatively dense unidirectional carbon tape is employed as a starting material. The maintenance of pressure without reduction thereof during initial cure in order to provide both for good lamination and controlled production of interconnecting gas paths is essential if delamination and disruptive trapped gas products are to be avoided. The discovery that use of bleeder materials on the outer surfaces of the part being produced can be detrimental because of the reduced migration of resin to such surfaces when unidirectional tape plies are being employed is applicable, in greater or lesser measure, depending upon the number of unidirectional tape plies incorporated into the laminate being produced.

The process normally begins with an analysis of the strength requirements for the part or body to be produced, and particularly the directions and the points on the part which will be subjected to the greatest loads during use. Physical size and configuration of the part must then be taken into account, and using this information, the numbers of plies of material, the sequence, (i.e. stacking order) of same with respect to woven cloth and unidirectional tape plies, and the relative angle of the warp of the cloth plies and the longitudinal direction of the tape plies with respect to the predicted vectors of load can be determined.

Next, the plies of woven cloth and unidirectional tape which have been been preimpregnated with a liquid resin material are laid up on a form, mold or the like, the shape of which conforms to the geometric form of the part to be produced. The face of the form or mold is covered with a suitable release material to insure that the formed body does not adhere to the mold face during processing. An arbitrary point on the mold or form is designated as 0° and the angle of offset for the warp of the woven cloth plies and the longitudinal direction of the tape plies can be accomplished as each ply is laid in place. The laid up part is then subjected to relatively low pressure conditions whereby the plies are forced together and any entrapped air is squeezed from the part prior to the initial cure process. This step is known in the art as "debulking".

Next, initial curing is effected wherein the resin, which has been preimpregnated into both the unidirectional tape plies and the woven cloth fabric plies, is heated to a temperature sufficient to cure thus forming a bonding matrix acting to cement the plies of material together. Typically, temperatures of about 325° F. are employed to cure the resin material. However, in order to avoid frothing or entrapment of gaseous products during the cure of the resin, the cure temperature must be approached slowly, and normally the initial cure requires approximately three hours during which time temperature is increased either at a steady rate or preferably with intermittent holds for a portion of the three hour period. Curing times as short as approximately 1½ hours can also be used successfully provided that the proper pressure conditions discussed hereinbelow are employed.

As noted above, pressure during the initial cure is highly important when employing plies of unidirectional carbon or graphite tape to form composite bodies. In most instances pressures in the range of from about 30 to about 60 psi have been found to be sufficient for controlling gas evolution during the initial cure while providing sufficient force for good lamination. It is particularly preferred to employ low pressures such as, for example, pressures of about 5 psi during the initial time period of the temperature cure with an increase in pressure at the point in time at which the particular resin employed reaches its gel point. Those skilled in the art will recognize that the resins used to impregnate carbonaceous fibers of the ply materials pass through a phase where they are highly viscous gel like materials prior to becoming a cured hardened material. It is theorized that use of low initial pressure helps allow solvent gases and polymerization products to escape while the use of higher pressures at the gel point of the resin compresses the laminates to form a denser stronger part. It should be noted that the above cure process has been described without the use of canvas or other bleeder materials in addition to the release film. Use of canvas or other bleeder materials which normally serve to avoid formation of a film of resin material on the surface of the parts being produced from woven cloth plies has been found generally to be detrimental to the production of materials using unidirectional tape plies. It is theorized that this is because there is less resin transfer through the dense unidirectional tape plies causing less resin to collect on the surface of the part. Use of bleeder materials thus, instead of usefully removing excess resin, can actually cause the outer layers to become resin starved during the cure cycle raising the possibility of delamination of the outer plies during later processing and/or use.

The initial cure has bonded the plies together and further increases in temperature will not cause the cured resin material to soften but rather decompose into gaseous products. The cured hybrid part (or unidirectional tape ply laminate) can then be subjected to a pyrolysis cycle during which the cured resin materials are decomposed to carbon and thus form the carbon-carbon substrate material comprising the carbonaceous fibers held in a carbon matrix. Since the part will have experienced temperatures in the range of about 325° F. during initial cure, pyrolysis can be accomplished by loading the part in a steel retort, restraining the part as necessary to prevent warping (for example, using flat plates for panels and mated machined graphite restraint tooling for contoured parts) filling the retort with calcined coke and raising the temperature quickly to approximately 325°. Depending upon the part geometry and the particular furnace employed, various time temperature profiles can be employed but normally a pyrolysis cycle of approximately three days in length and reaching final temperatures of approximately 1500° F. is employed. After providing a "soak" at 1500° F. to insure that resin materials have been completely pyrolyzed, the part is allowed to cool and is ready for the next step in processing.

Densification of the cured and pyrolyzed part whereby voids in the material are filled by depositing carbon therein, is accomplished in a conventional manner either through liquid impregnation with a carbonizable liquid material such as furfuryl alcohol or phenolic based resins or through chemical vapor deposition techniques. Preferably densification through liquid impregnation is employed. This process generally includes the steps of impregnating the cured and pyrolyzed carbon-carbon material with liquid resins, curing the resins and then pyrolyzing the impregnated composite material to reduce the cured resin to carbon. This process of impregnation, cure and pyrolysis is repeated, generally up to about five times, to obtain the density and strength desired for the particular part being fabricated.

After densification by either liquid impregnation or chemical vapor deposition techniques, the parts are treated in a manner so as to render them resistant to decomposition by oxidation which can occur when the part is subjected to high temperatures under atmospheric conditions. Conventional coating and post coating techniques as well as the unique silicon carbide based coatings and processes disclosed in assignee's co-pending applications, Ser. No. 251,798 filed Apr. 7, 1981 and Ser. No. 252,117 filed Apr. 8, 1981 can be utilized.

Carbon-carbon parts manufactured in accordance with the process described above, when coated to obtain oxidation resistance, can achieve flexure strengths in the range of from 50,000 to 99,000 psi at temperatures of from about 2500° to 4000° F. Such materials are particularly adapted for use in aerospace applications such as, for example, turbine engines and like applications.

Particularly, the preferred materials for forming the hybrid laminates and unidirectional tape laminate materials of the present invention are PAN (polyacrylonitrile) based graphite materials impregnated with phenolic resin wherein the resin solid content of the impregnated graphite cloth is in the range of from about 30 to about 40 weight percent; unidirectional tapes formed of graphite fibers based on PAN precursors and impregnated with phenolic resin, the resin solid contents of such tapes being in the range of from about 30 to about 40% by weight thereof; and, phenolic resin materials used for densification. Particularly preferred are woven cloth materials obtainable from Fiberite Corporation of Winona, Minn. under the trade designation "1041" which is manufactured from fibers in 3K bundles of T-300 made by Union Carbide woven in eight harness satin weave, heat treated and preimpregnated with K640 phenolic resin. Particularly preferred unidirectional tape materials are HMS fiber/K640 unidirectional tapes obtainable from Fiberite Corporation, Winona, Minn. which employ 10K bundles spread into a unidirectional tape form and preimpregnated with K640 phenolic resin. The thickness of these tape materials is approximately 0.006 inches which is about half that of T300 cloth. The tape can be obtained in three inch or twelve inch wide forms.

After initial lay up of a predetermined number of plies of the T300 cloth and HMS unidirectional tape, release films are placed on the upper and lower surfaces of the part being fabricated. Typical release films include Teflon coated cloth materials and open weave fiberglass cloth containing release agents.

Although a variety of time temperature profiles can be utilized during the initial cure, the preferred cycle includes raising the temperature from room conditions (about approximately 70° F.) to approximately 180° F., holding at 180° F. for approximately 45 minutes, and then completing the cycle by relatively steadily increasing the temperature to approximately 325° at three hours. Time and temperature cycles wherein 325° F. is reached in approximately one hour and a half have also been successfully employed.

The important pressure control during initial cure is preferably accomplished using a platen press device during the initial heat cure. It has been found preferable, in particular with the materials described immediately above, to employ initial pressures of approximately 5 psi, and then to raise the pressure to between about 30 and about 60 psi at the gel point of the resin materials, which is approximately in the range of from about 200° to 240° F.

A slow pyrolysis of the cured hybrid laminate or unidirectional tape laminate material is preferred generally over a three day period although longer periods of up to six days have been utilized in order to insure against the delamination problems caused by the products of decomposition. In general it is preferred to use a time and temperature profile wherein the furnace is preheated to approximately 250° F., raised at a rate of approximately 20° F. per hour to a temperature of approximately 1125° F., raised at a rate of approximately 40° F. per hour to a temperature of approximately 1500° F., held at 1500° F. for a three hour minimum and then allowed to cool.

Preferably densification is accomplished using K640 phenolic resin. It is preferred to place the part in a closed container wherein a vacuum is drawn to remove air and liquid phenolic resin is introduced until it completely covers the parts. Air pressure of from approximatley 80 to about 100 psi (i.e., shop air) is applied for approximately 30 minutes to help force the resin into the pores of the part. Excess resin is then removed and the part is wiped clean of excess resin. The part is then ready for a second cure and pyrolysis cycle. This densification procedure is repeated normally in the range of from about 3 to about 5 times depending on the necessary or desired strength of the final part.

The parts manufactured in accordance with the procedures set forth above and further treated to obtain oxidation resistance through formation of silicon carbide based protective coating systems are particularly suited in applications where high tensile and flexure strength, at temperatures in the range of 2500° to 4000° F., are required.

EXAMPLE 1

The method of the present invention was used to prepare a hybrid panel 21 inches long by 12 inches wide which comprised 13 plies of cloth and unidirectional tape arranged as set forth below. The cloth plies were obtained from Fiberite Corporation of Winona, Minn. under the trade designation "1041" which cloth is manufactured from T-300 fibers manufactured by Union Carbide in 3K bundles woven in eight harness satin weave heat treated and preimpregnated with K640 phenolic resin. The unidirectional tape plies were obtained from Fiberite Corporation, Winona, Minn. and are HMS fiber based (employing 10K bundles) and preimpregnated with K640 phenolic resin. Five plies of the cloth material and eight plies of the unidirectional tape material were then laid up in the following manner. An outer cloth ply was laid up first followed by two plies of tape, one ply of cloth, two plies of tape, one ply of cloth, two plies of tape, one ply of cloth, two plies of tape and finally an outer ply of cloth. The warp of the weave of the cloth material was parallel to the direction of the longitudinal direction of the fibers of the tape material and was along the 21 inch length of the laid up panel. The weight of the laid up sample was 829.5 grams. One ply of release teflon coated substrate was placed on the top and bottom of the panel and the panel was laid in a mold to restrain the edges, then inserted in a Wabash press where 30 psi pressure was applied to debulk the laid up panel.

The laid up debulked panel was then subjected to a cure cycle in a Wabash press in accordance with the time-temperature profile set forth in Table 1 below. The pressure throughout the cure cycle was held at approximately 30 psi during the heat cycle.

The weight of the final cured panel was 697.9 grams resulting in a cure weight loss of 15.9%. The cured panel was then subjected to four densification cycles wherein K640 phenolic resin was impregnated into the laminate, cured, and pyrolized to achieve the sample having a final geometric bulk density of approximately 1.55 g/cc. The mechanical strength of the resulting sample was tested after cutting into specimen bars in four point flexure in an Instron TTD test machine. The specimen width was 0.50" and its thickness was 0.10". The support span was 6.0", the loading span 2.0", and the crosshead motion 0.05 inches per minute. Four specimens were tested. The average results were 68.8 ksi flexure strength and $23.1 \times 10^6$ psi flexure modulus.

TABLE 1

| Time in Minutes | Temp. Setting °F. | Platens* #1 #2 | Thermocouple** °F. | Comments |
|---|---|---|---|---|
| 0 | 100 | 74–70 | 80 | Start |
| 5 | 120 | 104–107 | 100 | |
| 10 | 145 | 125–130 | 125 | Very Slight Resin Squeezed out at ends |
| 15 | 170 | 151–152 | 142 | |
| 20 | 175 | 176–173 | 169 | Resin on all sides, especially ends |
| 25 | 175 | 180–177 | 177 | Start 45 min. Hold |
| 70 | 195 | 180–177 | 177 | End Hold |
| 75 | 215 | 200–198 | 194 | |
| 80 | 230 | 225–219 | 215 | More resin out |
| 85 | 240 | 236–233 | 229 | |
| 90 | 250 | 247–242 | 238 | More resin out |
| 95 | 260 | 258–251 | 250 | |
| 100 | 270 | 269–261 | 260 | |
| 105 | 280 | 278–280 | 269 | |
| 110 | 287 | 287–280 | 279 | Outer resin foaming up |
| 115 | 295 | 293–286 | 284 | |
| 120 | 300 | 300–292 | 290 | |
| 125 | 305 | 303–298 | 295 | |
| 130 | 310 | 310–304 | 301 | |
| 136 | 215 | 314–310 | 306 | |
| 142 | 320 | 318–313 | 310 | |
| 145 | 325 | 323–320 | 312 | |
| 147 | 325 | 327–322 | 315 | Start 1 hour hold @ nominal 325° F. |
| | 325 | 327–322 | 320 | |
| | 330 | 327–322 | 321 | |
| | 325 | 334–331 | 328 | |
| | 0 | 330–326 | 324 | Slow cool down |

*Upper and lower platen temperature reading, °F.
**Reading of thermocouple inserted in part, °F.

EXAMPLE 2

The method of the present invention was employed to produce a 7 inch by 4 inch, 26 ply symmetric carbon-carbon laminate material formed from plies of T-300 cloth and unidirectional tape. The materials were of the same variety as described above in Example 1.

Twenty four plies of HMS tape were laid up aligned longitudinally. One ply of cloth each was laid up on top and bottom of the tape laminate to form face sheets. The warp of the weave of the cloth material was parallel to the direction of the longitudinal direction of the fiber of the tape material and was along the 7 inch length of the laid up panel. The weight of the laid up sample was 135.38 grams. The panel was laid up in a mold which served to restrain the edges during cure. The panel in the mold was inserted in a Wabash press where 5 psi pressure was applied initially with an increase of pressure to 30 psi during the cure cycle at the time indicated in Table 2 below. Table 2 is the time-temperature profile of the cure cycle.

The weight of the final cured panel was 121.52 grams resulting in a cure weight loss of 10.2%.

After the initial cure, the panel was densified through liquid impregnation using K640 phenolic resin in a conventional manner of impregnation, cure, and pyrolysis. A total of 4 cycles were employed for densification which results in a panel having a final geometric bulk density of 1.567 g/cc (grams per cubic centimeter). The mechanical strength of the resulting laminate was tested in three point flexure in an Instron TTD test machine.

Two bars were cut from the laminate with widths of 0.50" and thicknesses of 0.16". The support span was 6.0" and the crosshead motion 0.05 inches per minute. The average results were 99.1 ksi flexure strength and $22.7 \times 10^6$ psi flexure modulus.

TABLE 2

| Time in Minutes | Temp. Setting °F. | Platens °F. #1 #2 | Thermo-Couple °F. | Comments |
|---|---|---|---|---|
| 0 | 100 | 70-66 | 78 | 5 PSI (201 lbs) |
| 5 | 120 | 106—106 | 96 | |
| 10 | 145 | 128-131 | 123 | |
| 15 | 170 | 152-154 | 145 | |
| 20 | 175 | 177-174 | 167 | |
| 23 | 175 | 181—181 | 175 | Start 45 min. hold, fibers sighted on edge |
| 28 | 175 | 181—181 | 180 | slight resin flow |
| 40 | 175 | 181-180 | 182 | increased resin flow, lower than normal |
| 68 | 195 | 181-180 | 183 | end hold, increase to 30 psi |
| 73 | 215 | 201-194 | 195 | |
| 78 | 230 | 219-220 | 212 | |
| 83 | 240 | 239-233 | 229 | |
| 88 | 250 | 246-241 | 240 | |
| 93 | 260 | 260-251 | 251 | |
| 98 | 270 | 266-261 | 261 | |
| 103 | 280 | 279-271 | 271 | |
| 108 | 287 | 287-277 | 280 | |
| 113 | 295 | 294-286 | 288 | |
| 118 | 300 | 301-294 | 294 | |
| 123 | 305 | 304-299 | 300 | |
| 128 | 310 | 309-304 | 304 | |
| 133 | 315 | 315-310 | 311 | |
| 138 | 320 | 318-316 | 315 | Start 1 hr. hold |
| 143 | 325 | 321—321 | 319 | |
| 148 | 325 | 328-324 | 325 | |
| 155 | 325 | 328-326 | 326 | |
| 198 | 0 | 328-326 | 328 | End 1 hr. hold |
| 260 | 0 | 249-234 | 247 | |
| 325 | 0 | 202-187 | 201 | |
| 360 | 0 | 184-169 | 183 | |

While the invention has been described with particular reference to specific materials and processing conditions, those skilled in the art will now understand that various modifications, both in materials and in the disclosed process, may be desirable depending upon the particular part that is fabricated. All modifications and adaptations of the invention which fall within the scope of the appended claims are intended to be covered thereby.

We claim:

1. The process for producing carbon-carbon structural laminates which comprise plies of unidirectional resin impregnated carbon or graphite filament tape comprising the steps of:
   (a) laying up the plies of the carbon-carbon material in a manner such that the fibers of said filament tape plies are laid along predetermined directions so as to provide the part to be fabricated with increased strength along a predetermined direction of applied force;
   (b) curing said laid up laminate under pressures sufficient to provide controlled evolution of volatiles, at increasing temperatures until cured;
   (c) pyrolyzing said cured laminate at elevated temperatures; and
   (d) densifying the resulting laminate material.

2. The process of claim 1 wherein said laid up laminate is subjected to initial pressure so as to remove air entrapped during lay up prior to curing.

3. The process of claim 1 wherein that portion of the impregnated resin material which migrates to the surface of said laminate during cure is allowed to remain thereon during the curing step.

4. The process of claim 1 wherein said densification is effected through chemical vapor deposition techniques.

5. The process of claim 1 wherein said densification is effected through liquid resin impregnation, cure and pyrolysis cycles.

6. The process of claim 1 wherein initial pressure of about 5 psi is employed during said cure cycle and pressure is thereafter increased to from about 30 to about 60 psi when curing temperatures reach a range of from about 200° to about 240° F.

7. In a method for forming laminate carbon-carbon substrate materials which include plies of unidirectional resin impregnated filament tape the improvement comprising:
   curing said laminate in a platen press by applying pressures of at least about 30 psi without a decrease in pressure during cure and allowing the resin material exuded to the surface of said laminate to reside thereon during cure.

8. A process for fabricating carbon-carbon fiber reinforced laminate parts having increased load bearing ability along predetermined directions of force to which the part will be subjected during use comprising:
   (a) laying up alternate plies of carbon or graphite interwoven cloth and unidirectional carbon or graphite filament tape, the number and relative orientation of said tape plies to said cloth plies being determined by the load characteristics and physical size parameters of the part to be fabricated;
   (b) curing the resulting laid up laminate part of step (a) under pressure conditions of up to about 200 psi, without any reduction in pressure during the cure cycle, while heating the part at temperatures up to at least about 325° F.;
   (c) pyrolyzing said cured laminate at temperatures of up to about 1500° F.;
   (d) densifying said pyrolyzed laminate part by liquid impregnation with a carbonizable liquid resin material, curing said impregnated liquid resin material and pyrolyzing same and repeating said densification process to obtain the desired density and strength of the final part.

9. The process of claim 8 wherein the curing of said laid up laminate includes initial pressures of about 5 psi with an increase in pressure to about 30 to about 60 psi at the gel point of the resin material initially present in said plies.

10. The process of claim 8 wherein the resin material present in said plies is phenolic resin and said increase in pressure is effected at temperatures in the range of about 200° to about 240° F.

11. The process of claim 8 wherein said pressure is applied through use of a platen press apparatus.

12. The process of claim 8 wherein said interwoven cloth is a PAN based material.

13. The process of claim 8 wherein said unidirectional tape is a PAN base material.

14. The process of claim 8 wherein the resin material initially present in said cloth is phenolic resin.

15. The process of claim 8 wherein the resin material initially present in said unidirectional tape plies is phenolic resin material.

16. The process of claim 8 wherein said laid up laminate is debulked prior to cure.

17. The process of claim 8 wherein no bleeder materials are applied to the outside surfaces of said part during cure so as to allow any resin material migrating to said surfaces to remain thereon during the cure step.

18. The process for producing a laminate of carbon or graphite unidirectional filament tape plies comprising:
   (a) laying up plies of unidirectional tape either parallel or in a predetermined offset pattern;
   (b) curing the resultant laid up laminate under pressure conditions of up to about 200 psi, without any reduction in pressure during the cure cycle, which includes heating the part at increasing temperatures reaching at least about 325° F.;
   (c) pyrolyzing said cured laminate at temperatures of up to about 1500° F.;
   (d) densifying said pyrolyzed laminate part by liquid impregnation techniques.

19. The process of claim 18 wherein the cure cycle includes a 45 minute hold period at a temperature of from about 180° to about 200° F.

20. The process of claim 1 wherein said curing step comprises exertion of pressures of up to about 200 psi, without any drop in pressure during the cure cycle.

21. The process of claim 1 wherein the curing step comprises heating said laid up laminate at increasing temperatures reaching at least about 325° F.

22. The process of claim 1 wherein said pyrolyzing step comprises heating said cured laminate at temperatures of about 1500° F.

23. The carbon-carbon laminate produced by the process of claim 18.

24. A carbon-carbon fiber reinforced laminate composition fabricated for increased strength in a predetermined direction of load and comprising plies of unidirectional resin impregnated carbon or graphite filament tape formed by a process in which the initial cure of the laid up laminate includes pressures of at least about 30 psi which are not reduced during the cure cycle.

* * * * *